United States Patent
Tertin et al.

(10) Patent No.: US 9,796,057 B2
(45) Date of Patent: Oct. 24, 2017

(54) GUN BARREL ASSEMBLY

(71) Applicant: Saeilo Enterprises, Inc., Pomona, NY (US)

(72) Inventors: James A. Tertin, Baxter, MN (US); Joseph B. Goerges, Jenkins, MN (US)

(73) Assignee: Saeilo Enterprises, Inc., Pomona, NY (US)

( * ) Notice: Subject to any disclaimer, the term of this patent is extended or adjusted under 35 U.S.C. 154(b) by 0 days.

(21) Appl. No.: 14/597,309

(22) Filed: Jan. 15, 2015

(65) Prior Publication Data
US 2016/0209144 A1    Jul. 21, 2016

(51) Int. Cl.
| F41A 21/00 | (2006.01) |
| B23P 11/02 | (2006.01) |
| F41A 13/12 | (2006.01) |
| F41A 21/02 | (2006.01) |
| F41A 21/04 | (2006.01) |
| F41A 21/44 | (2006.01) |

(52) U.S. Cl.
CPC ............ B23P 11/025 (2013.01); F41A 13/12 (2013.01); F41A 21/02 (2013.01); F41A 21/04 (2013.01); F41A 21/44 (2013.01)

(58) Field of Classification Search
CPC ........ B23P 11/025; F41A 13/12; F41A 21/02; F41A 21/04; F41A 21/44
USPC ........................................ 42/76.01
See application file for complete search history.

(56) References Cited

U.S. PATENT DOCUMENTS

| 797,237 | A | * | 8/1905 | Smith | F41A 13/04 |
| | | | | | 89/1.2 |
| 2,847,786 | A | | 8/1958 | Hartley et al. | |
| 2,935,912 | A | * | 5/1960 | Hartley | F41A 13/12 |
| | | | | | 42/76.02 |
| 2,935,913 | A | | 5/1960 | Wilson | |
| 3,228,298 | A | | 1/1966 | Grandy et al. | |
| 3,517,585 | A | | 6/1970 | Slade | |
| 3,571,962 | A | | 3/1971 | Eig | |
| 3,641,870 | A | | 2/1972 | Eig | |
| 3,727,513 | A | * | 4/1973 | Wicks | F41A 13/12 |
| | | | | | 89/14.05 |
| 3,748,957 | A | * | 7/1973 | Arnold | F41A 21/04 |
| | | | | | 42/76.01 |
| 3,943,821 | A | * | 3/1976 | Seifried | F41A 21/12 |
| | | | | | 89/16 |
| 4,485,721 | A | | 12/1984 | Shankhla et al. | |
| 4,646,615 | A | | 3/1987 | Gladstone et al. | |

(Continued)

*Primary Examiner* — Michelle R Clement
(74) *Attorney, Agent, or Firm* — Alix, Yale & Ristas, LLP

(57) ABSTRACT

A gun barrel assembly includes an outer barrel tube, an inner barrel liner, a barrel breech cap and a barrel muzzle cap. The barrel tube and the barrel liner each longitudinally extend from a muzzle end to a breech end, and have axial through bores, with the barrel liner being disposed within and coaxial with the barrel tube bore. The breech cap and the muzzle cap each longitudinally extend from a front end to a rear end and have through axial through bores. The breech cap is mounted to the barrel liner breech end portion and contacts the barrel tube breech end. The muzzle cap is mounted to the barrel liner muzzle end portion and contacts the barrel tube muzzle end. The inside diameter of the barrel tube bore is greater than the outside diameter of the barrel liner whereby the barrel tube does not contact the barrel liner.

32 Claims, 9 Drawing Sheets

(56) References Cited

U.S. PATENT DOCUMENTS

| | | | |
|---|---|---|---|
| 4,685,236 A | 8/1987 | May | |
| 4,729,806 A | 3/1988 | Stein | |
| 4,747,225 A * | 5/1988 | Gstettner | B22F 3/1208 138/143 |
| 4,843,946 A | 7/1989 | Gladstone et al. | |
| 4,907,487 A * | 3/1990 | Tidman | F41B 6/00 124/3 |
| 4,913,029 A * | 4/1990 | Tidman | F41B 6/00 124/3 |
| 5,054,224 A | 10/1991 | Friar et al. | |
| 5,125,179 A | 6/1992 | Campbell et al. | |
| 5,285,592 A | 2/1994 | Sides | |
| 5,479,737 A * | 1/1996 | Osborne | F41A 21/12 42/76.01 |
| 5,531,150 A | 7/1996 | Gegaregian et al. | |
| 5,600,912 A | 2/1997 | Smith | |
| 5,657,568 A | 8/1997 | Christensen | |
| 5,692,334 A | 12/1997 | Christensen | |
| 5,804,756 A | 9/1998 | Christensen | |
| 5,915,937 A | 6/1999 | Christensen | |
| 5,928,799 A | 7/1999 | Sherman et al. | |
| 6,158,158 A * | 12/2000 | Wagner | F41A 21/04 42/76.02 |
| 6,167,794 B1 * | 1/2001 | Kathe | F41A 21/36 42/76.01 |
| 6,179,944 B1 | 1/2001 | Monolo et al. | |
| 6,189,431 B1 | 2/2001 | Danner et al. | |
| 6,230,429 B1 | 5/2001 | Smith | |
| 6,497,065 B1 * | 12/2002 | Huston | F41A 21/02 42/76.02 |
| 6,594,936 B1 * | 7/2003 | Sniezak | F41A 21/04 42/76.02 |
| 6,615,702 B1 * | 9/2003 | Julien | F41A 21/02 42/76.02 |
| 6,758,004 B2 | 7/2004 | Huston | |
| 6,889,464 B2 | 5/2005 | Degerness | |
| 7,353,741 B2 * | 4/2008 | Brixius | F41A 13/06 42/90 |
| 7,707,763 B2 * | 5/2010 | Brixius | F41A 13/06 42/76.01 |
| 7,721,478 B2 | 5/2010 | Withers et al. | |
| 7,775,200 B2 | 8/2010 | Anderson | |
| 7,810,272 B2 * | 10/2010 | Brixius | F41A 13/06 42/72 |
| 7,866,079 B2 | 1/2011 | Keeney et al. | |
| 7,921,590 B2 * | 4/2011 | Briggs | F41A 21/04 42/76.02 |
| 7,997,020 B2 * | 8/2011 | Brixius | F41A 13/06 42/72 |
| 8,245,618 B2 * | 8/2012 | Emde | F41A 21/44 42/96 |
| 8,316,568 B2 * | 11/2012 | Briggs | F41A 21/02 42/76.02 |
| 8,677,670 B2 | 3/2014 | Christensen et al. | |
| 8,701,326 B2 | 4/2014 | Zonshine | |
| 2005/0262997 A1 * | 12/2005 | Brixius | F41A 13/06 89/14.1 |
| 2007/0261286 A1 * | 11/2007 | Briggs | F41A 21/02 42/76.02 |
| 2010/0058921 A1 * | 3/2010 | Brixius | F41A 13/06 89/14.1 |
| 2010/0224053 A1 * | 9/2010 | Brixius | F41A 13/06 89/14.1 |
| 2010/0326266 A1 * | 12/2010 | Brixius | F41A 13/06 89/191.02 |
| 2011/0162246 A1 * | 7/2011 | Briggs | F41A 21/04 42/76.02 |
| 2011/0173864 A1 * | 7/2011 | Christensen | F41A 21/04 42/78 |
| 2013/0145669 A1 * | 6/2013 | Zonshine | F41A 21/10 42/75.02 |
| 2016/0003570 A1 * | 1/2016 | Tonkin | F41A 21/02 89/14.4 |

\* cited by examiner

GUN BARREL ASSEMBLY

BACKGROUND

This disclosure relates generally to gun barrels. More particularly, this disclosure relates to rifle barrels.

As rifle cartridges are continually fired the combustion gases and friction generated by the passage of the cartridge bullet through the barrel cause the barrel to heat up. The more cartridges that are fired, the hotter the barrel becomes. As the barrel heats up it expands and grows in length. This expansion and increased barrel length reduce the accuracy and performance of the rifle.

SUMMARY

There is provided a gun barrel assembly comprising an outer barrel tube, an inner barrel liner, a barrel breech cap and a barrel muzzle cap. The barrel tube longitudinally extends from a muzzle end to a breech end, and has an axial bore extending from the muzzle end to the breech end. The barrel liner is disposed within the barrel tube bore, longitudinally extends from a muzzle end to a breech end, has a bore coaxial with the barrel tube bore, a breech end portion and a muzzle end portion. The breech cap is mounted to the barrel liner breech end portion and contacts the barrel tube breech end. The breech cap has an axial bore that is coaxial with the barrel tube bore and extends longitudinally from a front surface to a rear surface. The muzzle cap is mounted to the barrel liner muzzle end portion and contacts the barrel tube muzzle end. The muzzle cap has an axial bore that is coaxial with the barrel tube bore and extends longitudinally from a front surface to a rear surface. The inside diameter of the barrel tube bore is greater than the outside diameter of the barrel liner whereby the barrel tube does not contact the barrel liner.

The gun barrel assembly further comprises a tubular barrel heat sink longitudinally extending from a front end to a rear end. The heat sink is disposed intermediate the barrel tube and the barrel liner, with the heat sink rear end disposed adjacent to the breech cap front surface.

The heat sink may be composed of a polymeric material, for example free machining polypropylene.

The heat sink may be mounted to the barrel liner by a bonding agent.

The barrel tube and the barrel liner may be composed of metal, with the barrel liner having a rifled inner surface.

The barrel tube may be composed of 6063 aluminum and the barrel liner may be composed of 4140 CM steel.

The barrel liner breech end portion and the barrel liner muzzle end portion each have a threaded outer surface.

The muzzle cap includes a front end segment and a rear end segment, the outer diameter of the front end segment is greater than the outer diameter of the rear end segment, with the front end segment defining a rear shoulder.

A portion of the muzzle cap bore in the muzzle cap rear end segment has a threaded inner surface connected to the threaded outer surface of the barrel liner muzzle end portion.

The muzzle cap front end segment includes at least one blind bore extending rearwardly from the muzzle cap front surface and having a threaded inner surface.

The muzzle cap may be composed of metal, for example 416 stainless steel.

The breech cap includes a front end segment, a rear end segment and a middle segment. The outer diameter of the middle segment is greater than the outer diameters of the front end segment and the rear end segment, with the middle segment defining a front shoulder and a rear shoulder.

The breech cap bore in the breech cap middle segment has a threaded inner surface connected to the threaded outer surface of the barrel liner breech end portion.

The breech cap may be composed of metal, for example 416 stainless steel.

There is also provided a method of assembling a gun barrel assembly having an outer barrel tube longitudinally extending from a muzzle end to a breech end and having an axial through bore, an inner barrel liner longitudinally extending from a muzzle end to a breech end and having a longitudinal through bore, a barrel breech cap longitudinally extending from a front surface to a rear surface and having a longitudinal through bore, a barrel muzzle cap longitudinally extending from a front surface to a rear surface and having a longitudinal through bore, and a tubular heat sink longitudinally extending from a front end to a rear end and having a longitudinal through bore. The method comprises attaching the breech cap to the barrel liner to form a first subassembly; heating the first subassembly; mounting the heat sink onto the first subassembly to form a second subassembly; mounting the barrel tube onto the second subassembly to form a third subassembly; attaching the muzzle cap to the third subassembly to form the gun barrel assembly; and cooling the gun barrel assembly.

Attaching the breech cap to the barrel liner comprises: inserting a breech end portion of the barrel liner through the breech cap front surface into the breech cap bore; engaging a thread on an outer surface of a breech end portion of the barrel liner with a thread on an inner surface of the breech cap bore; and rotating the breech cap relative to the barrel liner.

Attaching the breech cap to the barrel liner may also comprise torquing the breach cap to 130 inch pounds.

Attaching the breech cap to the barrel liner may also comprise bonding the breech cap to the barrel liner with a bonding agent.

Heating the first subassembly comprises heating the barrel liner and breech cap to between 271° F. and 275° F.

Mounting the heat sink onto the first subassembly to form a second subassembly comprises inserting the barrel liner muzzle end through the heat sink bore until the heat sink rear end is proximate to the breech cap front surface.

Mounting the heat sink onto the first subassembly to form a second subassembly may also comprise bonding the heat sink to the barrel liner with a bonding agent.

Mounting the barrel tube onto the second subassembly to form a third subassembly comprises inserting the barrel liner muzzle end through the barrel tube breech end into the barrel tube bore until the barrel tube breech end abuts a front shoulder of the breech cap.

Attaching the muzzle cap to the third subassembly to form the gun barrel assembly comprises: inserting a muzzle end portion of the barrel liner through the muzzle cap rear surface into the muzzle cap bore; engaging a thread on an outer surface of a muzzle end portion of the barrel liner with a thread on an inner surface of the muzzle cap bore; and rotating the muzzle cap relative to the barrel liner until a rear shoulder of the muzzle cap abuts the muzzle end of the barrel tube.

Attaching the muzzle cap to the third subassembly to form the gun barrel assembly may also comprise torquing the muzzle cap to 130-140 inch pounds.

Attaching the muzzle cap to the third subassembly to form the gun barrel assembly may also comprise bonding the muzzle cap to the barrel liner with a bonding agent.

BRIEF DESCRIPTION OF THE DRAWINGS

The present disclosure may be better understood and its numerous objects and advantages will become apparent to those skilled in the art by reference to the accompanying drawings in which.

DETAILED DESCRIPTION

Figure 1:
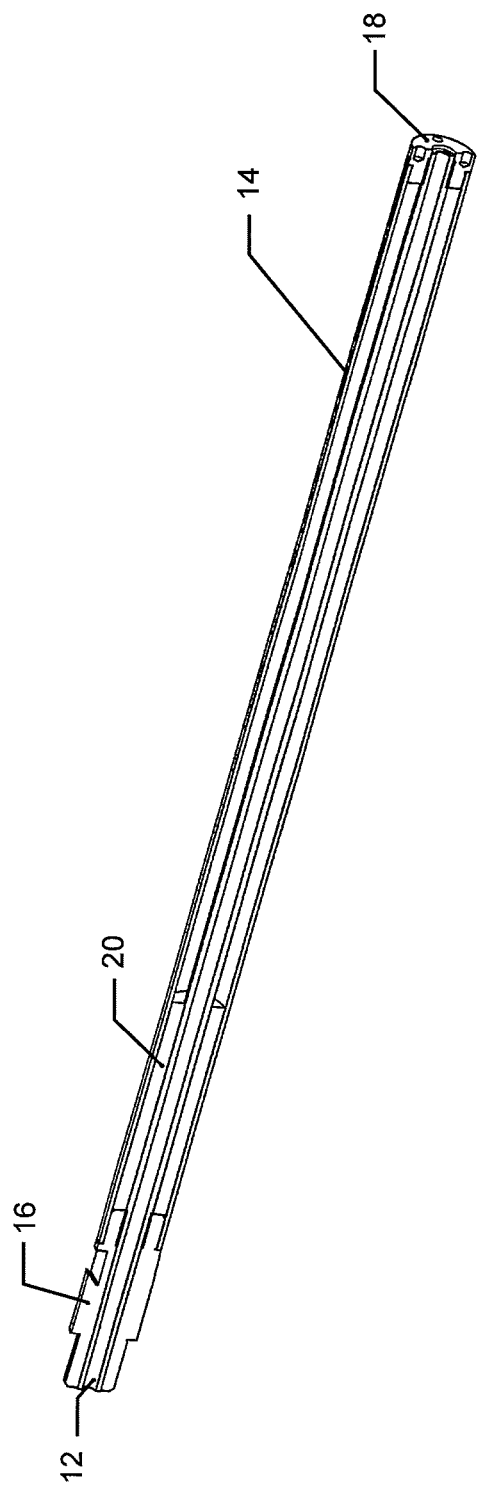
FIG. 1 is a perspective view of a gun barrel assembly in accordance with the present disclosure.
Figure 2:
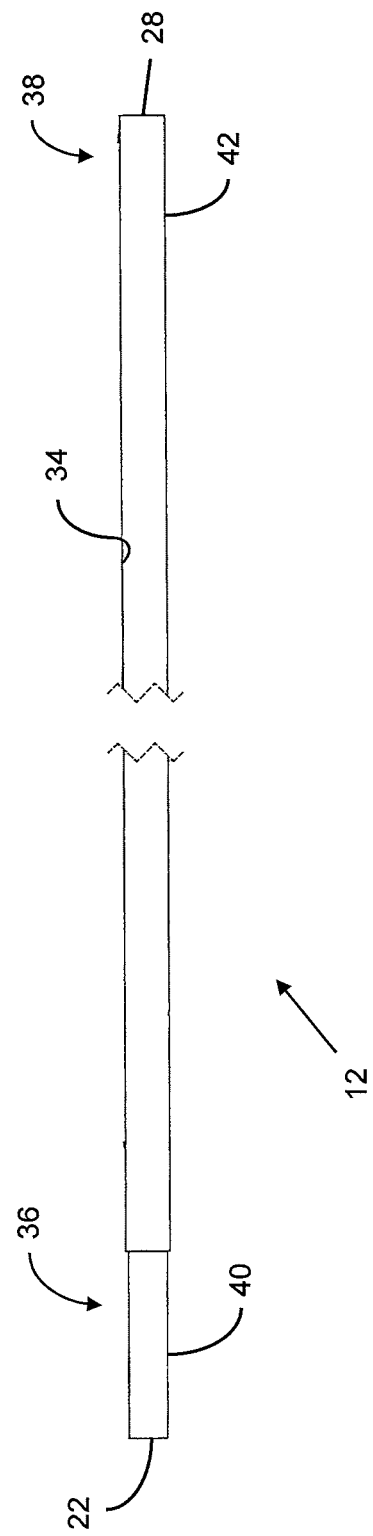
FIG. 2 is a side view of the barrel liner of FIG. 1.
Figure 3:
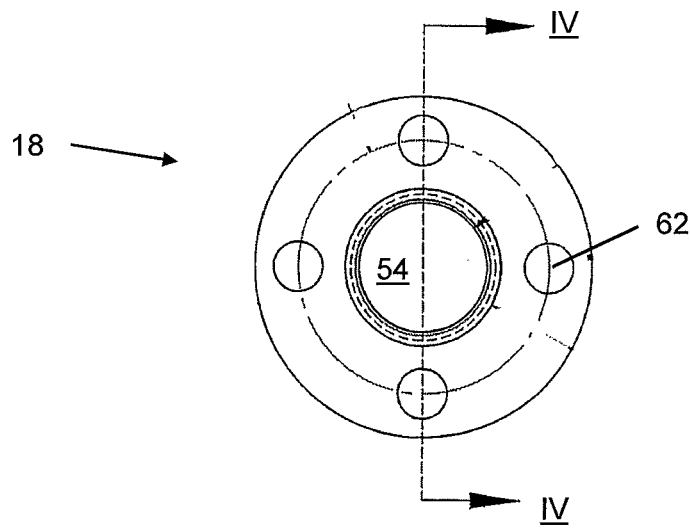
FIG. 3 is an enlarged front view of the barrel muzzle cap of FIG. 1.
Figure 4:
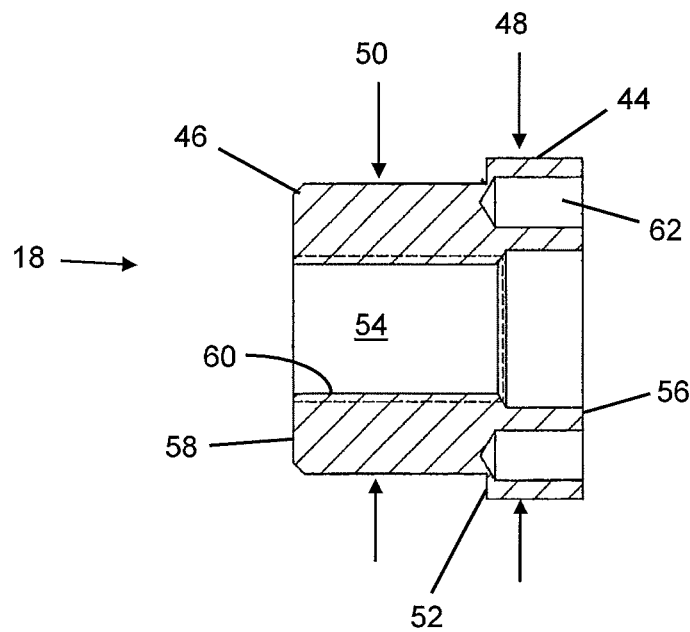
FIG. 4 is a cross-section view taken along line IV-IV of FIG. 3.
Figure 5:
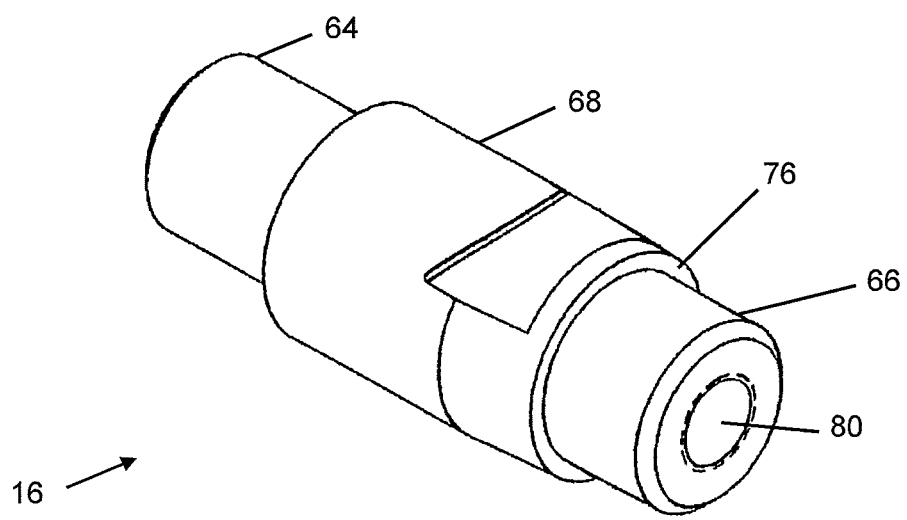
FIG. 5 is an enlarged perspective view of the barrel breech cap of FIG. 1.
Figure 6:
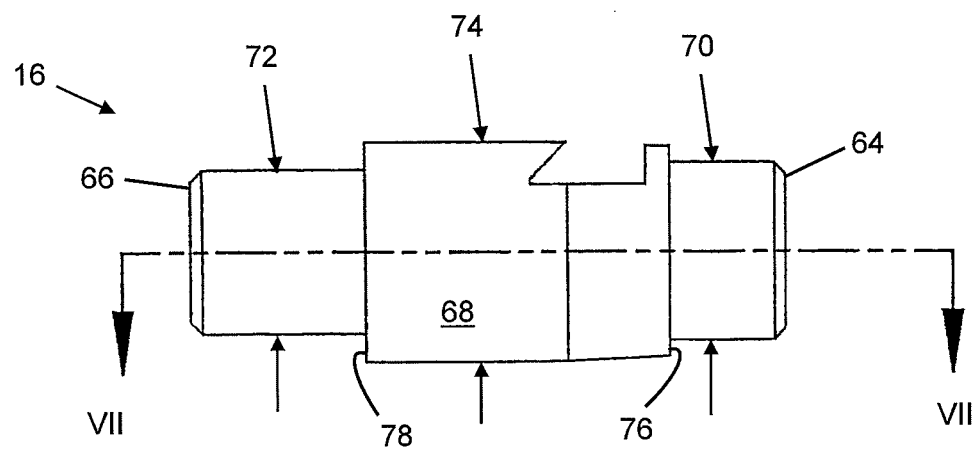
FIG. 6 is a side view of the barrel breech cap of FIG. 5.
Figure 7:
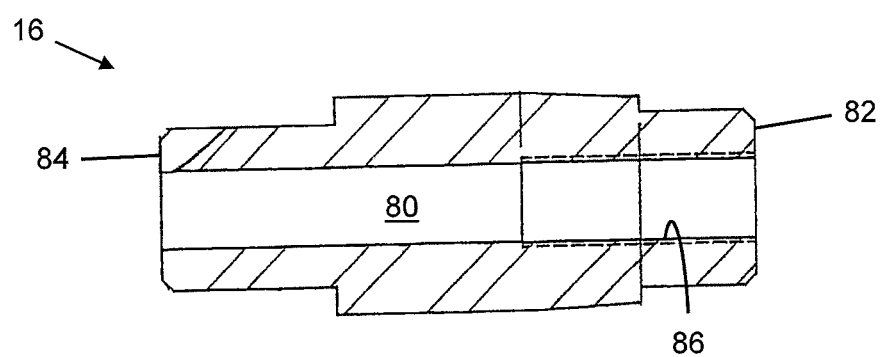
FIG. 7 is a cross-section view taken along line VII-VII of FIG. 6.
Figure 8:
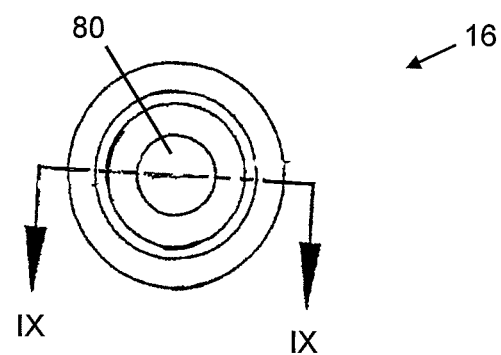
FIG. 8 is a rear view of the barrel breech cap of FIG. 5.
Figure 9:
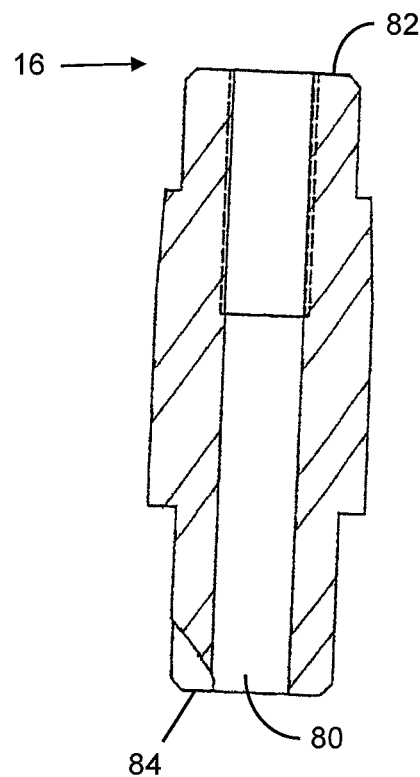
FIG. 9 is a cross-section view taken along line IX-IX of FIG. 8.
Figure 10:
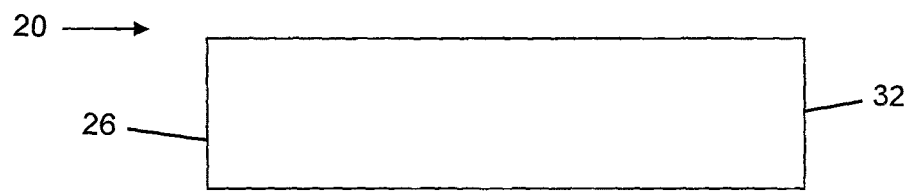
FIG. 10 is an enlarged side view of the barrel heat sink of FIG. 1.
Figure 11:
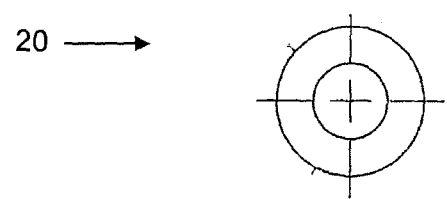
FIG. 11 is an end view of the barrel heat sink of FIG. 10.
Figure 12:
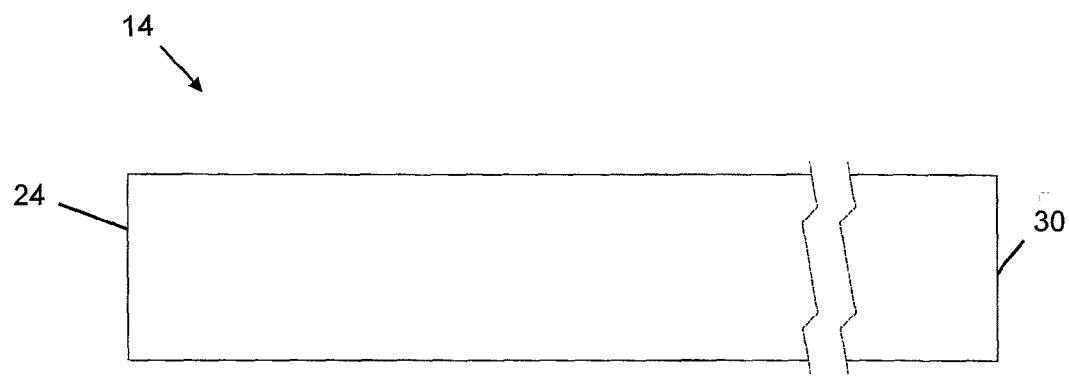
FIG. 12 is an enlarged side view of the barrel tube of FIG. 1.
Figure 13:
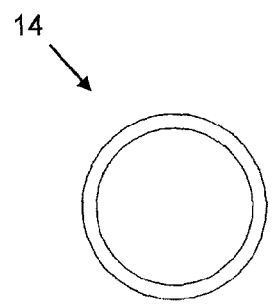
FIG. 13 is an end view of the barrel tube of FIG. 12.

With reference to the drawings wherein like numerals represent like parts throughout the several figures, a gun barrel assembly in accordance with the present disclosure is generally designated by the numeral 10. The modular gun barrel assembly 10 has a simple in design but has a specific assembly process that insures top accuracy and performance.

With reference to FIGS. 1-13, the gun barrel assembly 10 includes five components: an inner barrel liner 12; an outer barrel tube 14; a barrel breech cap 16; a barrel muzzle cap 18; and a barrel heat sink 20.

The barrel liner 12, the barrel tube 14 and the heat sink 20 each have a tubular structure with oppositely disposed breech ends 22, 24, 26 and muzzle ends 28, 30, 32. The barrel liner 12 has a rifled inner surface 34 and breech end and muzzle end portions 36, 38, each having a threaded outer surface 40, 42. The barrel tube 14 and barrel liner 12 are composed of metal, for example the barrel tube 14 may be composed of 6063 aluminum and the barrel liner 12 may be composed of 4140 CM steel. The heat sink 20 is composed of a polymeric material, for example free machining polypropylene. It has been found experimentally that the heat sink 20 substantially prevents leading of the inner surface 34 of the barrel liner 12.

The muzzle cap 18 includes a front end segment 44 and a rear end segment 46, each having an outer diameter 48, 50. The outer diameter 48 of the front end segment 44 is greater than the outer diameter 50 of the rear end segment 46, the front end segment 44 forming a rear shoulder 52. An axial through bore 54 extends longitudinally from the front surface 56 of the front end segment 44 to the rear surface 58 of the rear end segment 46, with the portion of the bore 54 in the rear end segment 46 having a threaded inner surface 60. One or more blind bores 62 extend rearwardly from the front surface 56 of the front end segment 44. The inner surface of the one or more blind bores 62 may be threaded. The muzzle cap 18 is composed of metal, for example 416 stainless steel.

The breech cap 16 includes a front end segment 64, a rear end segment 66 and a middle segment 68, each having an outer diameter 70, 72, 74. The outer diameter 74 of the middle segment 68 is greater than the outer diameters 70, 72 of the front end segment 64 and the rear end segment 66, the middle segment 68 forming a front shoulder 76 and a rear shoulder 78. An axial through bore 80 extends longitudinally from the front surface 82 of the front end segment 64 to the rear surface 84 of the rear end segment 66, with the bore in the front end segment 64 and a portion of the middle segment 68 having a threaded inner surface 86. The breech cap 16 is composed of metal, for example 416 stainless steel.

When assembled as described below, the barrel liner breech end portion 36 is mounted within breech cap through bore 80 by a threaded connection, the barrel liner muzzle end portion 38 is mounted within the muzzle cap through bore 54, and the heat sink 20 is disposed around the barrel liner 12 within the barrel tube 14 adjacent to the breech end cap 16, as shown in FIG. 1. The outside diameter 83 of the barrel liner 12 is less than the inside diameter 85 of the barrel tube 14 such that there is a gap 87 between the barrel liner 12 and the barrel tube 14, as shown in FIG. 1. Rather, the barrel liner 12 floats inside the barrel tube 14. The barrel liner 12 itself only touches the breech cap 16, the muzzle cap 18 and the heat sink 20.

As rifles having conventional barrels are fired, the rifle barrel heats up causing it to expand and grow in length. The method of manufacturing the subject gun barrel assembly 10 described below takes into account the heat expansion of the rifle barrel, compensating for the decreased efficiency and accuracy experienced by conventional rifle barrels.

Figure 14:
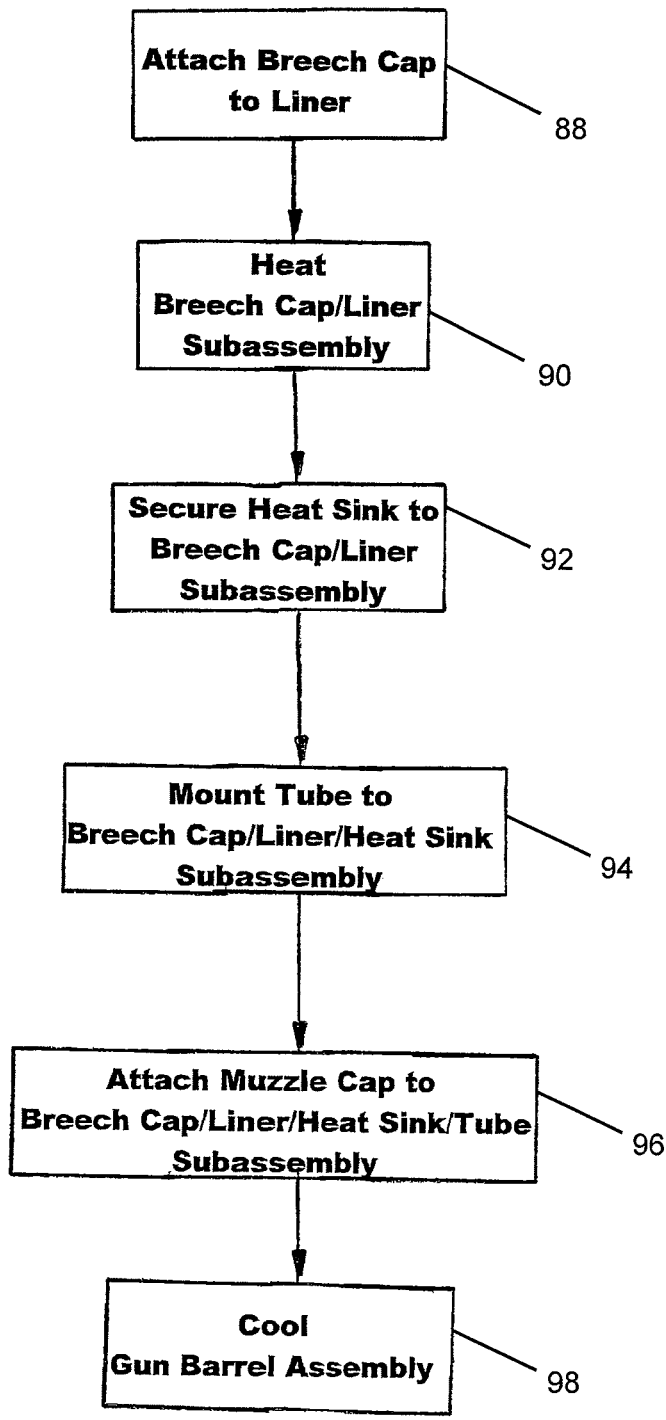
FIG. 14 is a flow diagram of a method of manufacturing a gun barrel assembly in accordance with the present disclosure.

To assemble the gun barrel assembly 10, the breech cap 16 is attached 88 (FIG. 14) to the barrel liner 12 by inserting the breech end portion 36 of the barrel liner 12 within the breech cap through bore 80, engaging the thread 40 on the outer surface of the barrel liner breech end portion 36 with the thread 86 on the inner surface of the breech cap through bore 80 and rotating the breech cap 16 relative to the barrel liner 12. The breach cap 16 may be torqued at 130 inch pounds and a bonding agent such as loctite 620™ may be used in the threaded joint.

The barrel liner and breech cap sub assembly is heated 90, for example between 271° F. and 275° F., causing the barrel liner 12 to grow 0.006 to 0.007 inches in length.

Once the barrel liner and breech cap subassembly have reached proper temperature the heat sink 20 is slid 92 onto the barrel liner and breech cap subassembly from the muzzle end 28. The heat sink 20 may be secured in position on the barrel liner 12 with a bonding agent, such as loctite 620™.

The barrel liner 12 is rapidly inserted through the barrel tube 14, whereby there is substantially no loss in temperature of the barrel liner and breech cap subassembly, until the breech end 24 of the barrel tube 14 abuts the front shoulder 76 of the breech cap 16.

The muzzle cap 18 is attached 96 to the barrel liner 12 by inserting the muzzle end portion 38 of the barrel liner 12 within the muzzle cap through bore 54, engaging the thread 42 on the outer surface of the barrel liner muzzle end portion 38 with the thread 60 on the inner surface of the muzzle cap through bore 54 and rotating the muzzle cap 18 relative to the barrel liner 12 until the muzzle end 30 of the barrel tube 14 abuts the rear shoulder 52 of the muzzle cap 18. The muzzle cap 18 may be torqued at 130 to 140 inch pounds and a bonding agent such as loctite 620™ may be used in the threaded joint.

The gun barrel assembly 10 is then cooled 98. As the barrel liner 12 cools it tries to shrink the length that it was expanded when heated. The contact between the barrel tube 14 and the front shoulder 76 of the breech cap 16 and the rear shoulder 52 of the muzzle cap 18 prevent the barrel liner 12 from shrinking. The tension force generated by the shrinkage is absorbed by the barrel liner 12 itself, thus creating a very solid mechanically locked assembly. The gap 87 between the barrel liner 12 and the barrel tube 14 facilitates distribution of the tension force by preventing binding that could be caused by contact between the barrel liner 12 and the barrel tube 14. This mechanical locking creates two positive results for the performance of the gun barrel assembly 10. It securely locks the entire gun barrel assembly 10 so that no bullet point of impact changes occur as the barrel liner 12 heats and cools during normal operation. It also prevents relative motion between the gun barrel assembly components during normal operation.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A gun barrel assembly comprising:
   an outer barrel tube longitudinally extending from a muzzle end to a breech end, the barrel tube defining an axis and an axial bore extending from the muzzle end to the breech end;
   an inner barrel liner longitudinally extending from a muzzle end to a breech end, the barrel liner being disposed within the barrel tube bore, the barrel liner defining a bore coaxial with the barrel tube bore and having a breech end portion and a muzzle end portion;
   a barrel breech cap mounted to the barrel liner breech end portion and contacting the barrel tube breech end, the breech cap defining an axial bore extending longitudinally from a front surface to a rear surface, the breech cap bore being coaxial with the barrel tube bore;
   a barrel muzzle cap mounted to the barrel liner muzzle end portion and contacting the barrel tube muzzle end, the muzzle cap defining an axial bore extending longitudinally from a front surface to a rear surface, the muzzle cap bore being coaxial with the barrel tube bore; and
   a tubular barrel heat sink longitudinally extending from a front end to a rear end, the barrel heat sink being disposed intermediate the barrel tube and the barrel liner, the heat sink rear end being disposed adjacent to the breech cap front surface, and the heat sink front end being disposed a distance from the barrel muzzle cap rear surface forming a gap between the inner barrel liner and the outer barrel tube;
   wherein the barrel tube bore has an inside diameter and the barrel liner has an outside diameter, the barrel tube bore inside diameter being greater than the barrel liner outside diameter whereby the barrel tube does not contact the barrel liner.

2. The gun barrel assembly of claim 1 wherein the heat sink is composed of a polymeric material.

3. The gun barrel assembly of claim 2 wherein the heat sink is composed of free machining polypropylene.

4. The gun barrel assembly of claim 1 wherein the heat sink is mounted to the barrel liner by a bonding agent.

5. The gun barrel assembly of claim 1 wherein the barrel tube and the barrel liner are composed of metal, the barrel liner having a rifled inner surface.

6. The gun barrel assembly of claim 5 wherein the barrel tube is composed of 6063 aluminum and the barrel liner is composed of 4140 CM steel.

7. The gun barrel assembly of claim 1 wherein the barrel liner breech end portion and the barrel liner muzzle end portion each have a threaded outer surface.

8. The gun barrel assembly of claim 7 wherein the muzzle cap includes a front end segment and a rear end segment, each having an outer diameter, the outer diameter of the front end segment being greater than the outer diameter of the rear end segment, the front end segment defining a rear shoulder.

9. The gun barrel assembly of claim 8 wherein a portion of the muzzle cap bore in the muzzle cap rear end segment has a threaded inner surface connected to the threaded outer surface of the barrel liner muzzle end portion.

10. The gun barrel assembly of claim 7 wherein the muzzle cap front end segment defines at least one blind bore having a threaded inner surface extending rearwardly from the muzzle cap front surface.

11. The gun barrel assembly of claim 10 wherein the muzzle cap is composed of metal.

12. The gun barrel assembly of claim 11 wherein the muzzle cap is composed of 416 stainless steel.

13. The gun barrel assembly of claim 7 wherein the breech cap includes a front end segment, a rear end segment and a middle segment, each having an outer diameter, the outer diameter of the middle segment being greater than the outer diameters of the front end segment and the rear end segment, the middle segment defining a front shoulder and a rear shoulder.

14. The gun barrel assembly of claim 13 wherein a portion of the breech cap bore in the breech cap middle segment has a threaded inner surface connected to the threaded outer surface of the barrel liner breech end portion.

15. The gun barrel assembly of claim 13 wherein the breech cap is composed of metal.

16. The gun barrel assembly of claim 15 wherein the breech cap is composed of 416 stainless steel.

17. A gun barrel assembly comprising:
   an outer barrel tube longitudinally extending from a muzzle end to a breech end, the barrel tube defining an axis and an axial bore extending from the muzzle end to the breech end;
   an inner barrel liner longitudinally extending from a muzzle end to a breech end, the barrel liner being disposed within the barrel tube bore, the barrel liner defining a bore coaxial with the barrel tube bore and having a breech end portion and a muzzle end portion;
   a barrel breech cap mounted to the barrel liner breech end portion and contacting the barrel tube breech end, the breech cap defining an axial bore extending longitudinally from a front surface to a rear surface, the breech cap bore being coaxial with the barrel tube bore;
   a barrel muzzle cap mounted to the barrel liner muzzle end portion and contacting the barrel tube muzzle end, the muzzle cap defining an axial bore extending longitudinally from a front surface to a rear surface, the muzzle cap bore being coaxial with the barrel tube bore; and a tubular barrel heat sink longitudinally extending from a front end to a rear end, the barrel heat sink being disposed intermediate the barrel tube and the barrel liner, the heat sink rear end being disposed adjacent to the breech cap front surface, and the heat sink front end being disposed a distance from the barrel muzzle cap rear surface forming a gap between the inner barrel liner and the outer barrel tube.

18. The gun barrel assembly of claim 17 wherein the heat sink is composed of a polymeric material.

19. The gun barrel assembly of claim 18 wherein the heat sink is composed of free machining polypropylene.

20. The gun barrel assembly of claim 17 wherein the heat sink is mounted to the barrel liner by a bonding agent.

21. The gun barrel assembly of claim 17 wherein the barrel tube and the barrel liner are composed of metal, the barrel liner having a rifled inner surface.

22. The gun barrel assembly of claim 21 wherein the barrel tube is composed of 6063 aluminum and the barrel liner is composed of 4140 CM steel.

23. The gun barrel assembly of claim 17 wherein the barrel liner breech end portion and the barrel liner muzzle end portion each have a threaded outer surface.

24. The gun barrel assembly of claim 23 wherein the muzzle cap includes a front end segment and a rear end segment, each having an outer diameter, the outer diameter of the front end segment being greater than the outer diameter of the rear end segment, the front end segment defining a rear shoulder.

25. The gun barrel assembly of claim 24 wherein a portion of the muzzle cap bore in the muzzle cap rear end segment has a threaded inner surface connected to the threaded outer surface of the barrel liner muzzle end portion.

26. The gun barrel assembly of claim 23 wherein the muzzle cap front end segment defines at least one blind bore having a threaded inner surface extending rearwardly from the muzzle cap front surface.

27. The gun barrel assembly of claim 26 wherein the muzzle cap is composed of metal.

28. The gun barrel assembly of claim 27 wherein the muzzle cap is composed of 416 stainless steel.

29. The gun barrel assembly of claim 23 wherein the breech cap includes a front end segment, a rear end segment and a middle segment, each having an outer diameter, the outer diameter of the middle segment being greater than the outer diameters of the front end segment and the rear end segment, the middle segment defining a front shoulder and a rear shoulder.

30. The gun barrel assembly of claim 29 wherein a portion of the breech cap bore in the breech cap middle segment has a threaded inner surface connected to the threaded outer surface of the barrel liner breech end portion.

31. The gun barrel assembly of claim 29 wherein the breech cap is composed of metal.

32. The gun barrel assembly of claim 31 wherein the breech cap is composed of 416 stainless steel.

* * * * *